US011812222B2

(12) United States Patent
Sanger et al.

(10) Patent No.: US 11,812,222 B2
(45) Date of Patent: *Nov. 7, 2023

(54) TECHNIQUE FOR DIRECTING AUDIO IN AUGMENTED REALITY SYSTEM

(71) Applicant: MAGIC LEAP, INC., Plantation, FL (US)

(72) Inventors: George Alistair Sanger, Coronado, CA (US); Samuel A. Miller, Hollywood, FL (US); Brian Schmidt, Bellevue, WA (US); Anastasia Andreyevna Tajik, Fort Lauderdale, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/816,088

(22) Filed: Jul. 29, 2022

(65) Prior Publication Data
US 2022/0369044 A1 Nov. 17, 2022

Related U.S. Application Data

(63) Continuation of application No. 16/698,794, filed on Nov. 27, 2019, now Pat. No. 11,445,305, which is a
(Continued)

(51) Int. Cl.
*H04R 25/00* (2006.01)
*G06F 3/01* (2006.01)

(52) U.S. Cl.
CPC ........... *H04R 25/407* (2013.01); *G06F 3/012* (2013.01); *G06F 3/013* (2013.01); *H04R 25/405* (2013.01);
(Continued)

(58) Field of Classification Search
CPC .. H04R 25/407; H04R 25/405; H04R 25/505; H04R 2225/43; G06F 3/012; G06F 3/013
See application file for complete search history.

(56) References Cited

U.S. PATENT DOCUMENTS

| 5,901,232 A | 5/1999 | Gibbs |
| 6,757,397 B1 * | 6/2004 | Buecher .................. H04R 1/04 348/169 |

(Continued)

FOREIGN PATENT DOCUMENTS

| CN | 105323679 A | 2/2016 |
| JP | 08-298635 | 11/1996 |

(Continued)

OTHER PUBLICATIONS

Extended European Search Report for EP Patent Appln. No. 22176653.8 dated Sep. 7, 2022.

(Continued)

*Primary Examiner* — Oyesola C Ojo
(74) *Attorney, Agent, or Firm* — Vista IP Law Group, LLP

(57) ABSTRACT

A hearing aid comprises a sensor configured for detecting a focus of an end user on a real sound source, a microphone assembly configured for converting sounds into electrical signals, a speaker configured for converting the electrical signals into sounds, and a control subsystem configured for modifying the direction and/or distance of a greatest sensitivity of the microphone assembly based on detected focus. A virtual image generation system comprises memory storing a three-dimensional scene, a sensor configured for detecting a focus of the end user on a sound source, a speaker configured for conveying sounds to the end user, and a control subsystem configured for causing the speaker to preferentially convey a sound originating from the sound source in response to detection of the focus, and for rendering image frames of the scene, and a display subsystem configured for sequentially displaying the image frames to the end user.

18 Claims, 12 Drawing Sheets

Related U.S. Application Data continuation of application No. 15/423,415, filed on Feb. 2, 2017, now Pat. No. 10,536,783.

(60) Provisional application No. 62/291,363, filed on Feb. 4, 2016.

(52) U.S. Cl.
CPC ....... *H04R 25/505* (2013.01); *H04R 2225/43* (2013.01)

(56) References Cited

U.S. PATENT DOCUMENTS

| | | | |
|---|---|---|---|
| 8,750,541 B1 | 6/2014 | Dong et al. | |
| 8,781,142 B2 | 7/2014 | Olafsson et al. | |
| 8,867,763 B2* | 10/2014 | Bouse | H04R 25/407 381/313 |
| 9,285,589 B2 | 3/2016 | Osterhout et al. | |
| 9,292,758 B2 | 3/2016 | Polo | |
| 9,310,559 B2 | 4/2016 | Macnamara | |
| 9,596,554 B2 | 3/2017 | Sherman | |
| 9,641,942 B2* | 5/2017 | Strelcyk | H04R 25/40 |
| 9,671,566 B2 | 6/2017 | Abovitz et al. | |
| 9,703,369 B1 | 7/2017 | Mullen | |
| 9,848,260 B2* | 12/2017 | Conliffe | G02C 11/10 |
| 9,905,244 B2 | 2/2018 | Glasgow et al. | |
| 9,949,056 B2 | 4/2018 | Ranieri et al. | |
| 10,055,191 B2* | 8/2018 | Vennström | H04S 7/303 |
| 10,206,042 B2 | 2/2019 | Hviid et al. | |
| 11,498,282 B1* | 11/2022 | Walsh | B29C 64/20 |
| 2002/0041695 A1* | 4/2002 | Luo | H04R 25/407 381/313 |
| 2002/0103649 A1* | 8/2002 | Basson | G09B 21/00 704/E11.003 |
| 2007/0195012 A1* | 8/2007 | Ichikawa | G02B 27/017 345/8 |
| 2008/0154946 A1 | 6/2008 | Chun et al. | |
| 2008/0231926 A1 | 9/2008 | Klug et al. | |
| 2008/0253575 A1 | 10/2008 | Lorgeoux et al. | |
| 2009/0128919 A1* | 5/2009 | Kim | G02B 27/0172 359/630 |
| 2009/0174946 A1 | 7/2009 | Raviv et al. | |
| 2010/0074460 A1* | 3/2010 | Marzetta | G02C 11/06 381/313 |
| 2011/0007277 A1 | 1/2011 | Solomon | |
| 2011/0107270 A1 | 5/2011 | Wang et al. | |
| 2011/0221659 A1 | 9/2011 | King et al. | |
| 2012/0075168 A1 | 3/2012 | Osterhout et al. | |
| 2012/0113140 A1 | 5/2012 | Hilliges et al. | |
| 2012/0127284 A1 | 5/2012 | Bar-Zeev et al. | |
| 2012/0162259 A1* | 6/2012 | Sakai | G02B 27/0093 345/634 |
| 2012/0206452 A1 | 8/2012 | Geisner et al. | |
| 2012/0235886 A1 | 9/2012 | Border et al. | |
| 2012/0266087 A1 | 10/2012 | Edecker et al. | |
| 2013/0016379 A1 | 1/2013 | Lou et al. | |
| 2013/0123962 A1* | 5/2013 | Mizuta | A63F 13/54 700/94 |
| 2013/0222371 A1 | 8/2013 | Reitan | |
| 2013/0223660 A1* | 8/2013 | Olafsson | H04R 25/407 381/313 |
| 2013/0278631 A1 | 10/2013 | Border et al. | |
| 2013/0328925 A1 | 12/2013 | Latta et al. | |
| 2014/0063061 A1 | 3/2014 | Reitan | |
| 2014/0067381 A1 | 3/2014 | Li et al. | |
| 2014/0146394 A1 | 5/2014 | Tout et al. | |
| 2014/0213279 A1 | 7/2014 | Hiltunen et al. | |
| 2014/0240351 A1 | 8/2014 | Scavezze et al. | |
| 2014/0267410 A1 | 9/2014 | Fein et al. | |
| 2015/0035861 A1 | 2/2015 | Salter | |
| 2015/0036850 A1* | 2/2015 | Barthel | H04R 25/40 381/313 |
| 2015/0055808 A1 | 2/2015 | Vennström et al. | |
| 2015/0063603 A1 | 3/2015 | Henderek et al. | |
| 2015/0172814 A1 | 6/2015 | Usher et al. | |
| 2015/0212576 A1 | 7/2015 | Ambrus | |
| 2015/0281833 A1 | 10/2015 | Shinenaga et al. | |
| 2015/0301787 A1 | 10/2015 | Greco | |
| 2015/0333717 A1* | 11/2015 | Pontoppidan | H03G 3/00 381/98 |
| 2015/0341734 A1 | 11/2015 | Sherman | |
| 2015/0355805 A1 | 12/2015 | Chandler et al. | |
| 2016/0080874 A1* | 3/2016 | Fullam | G06F 3/013 381/313 |
| 2016/0093108 A1 | 3/2016 | Mao et al. | |
| 2016/0142830 A1* | 5/2016 | Hu | G06T 11/60 381/313 |
| 2016/0150064 A1* | 5/2016 | Norris | H04M 1/6033 455/569.1 |
| 2016/0196692 A1 | 7/2016 | Kjallstrom et al. | |
| 2017/0045941 A1 | 2/2017 | Tokubo et al. | |
| 2017/0086008 A1 | 3/2017 | Robinson | |
| 2017/0098453 A1 | 4/2017 | Wright | |
| 2017/0110142 A1* | 4/2017 | Fan | G10L 25/84 |
| 2017/0195787 A1* | 7/2017 | Ichimura | H04R 3/005 |
| 2017/0208392 A1 | 7/2017 | Smithers et al. | |
| 2017/0223473 A1 | 8/2017 | Benattar | |
| 2017/0230760 A1 | 8/2017 | Sanger et al. | |
| 2017/0272627 A1* | 9/2017 | Henderek | G06T 7/74 |
| 2017/0355805 A1 | 12/2017 | Yang et al. | |
| 2017/0364752 A1 | 12/2017 | Zhou et al. | |
| 2018/0008141 A1 | 1/2018 | Krueger | |
| 2018/0150275 A1 | 5/2018 | Mate | |
| 2018/0246698 A1 | 8/2018 | Huang et al. | |
| 2018/0349088 A1* | 12/2018 | Leppänen | G06F 3/011 |

FOREIGN PATENT DOCUMENTS

| | | |
|---|---|---|
| JP | 2004-267433 | 9/2004 |
| JP | 2012-008290 | 1/2012 |
| JP | 2012-029209 | 2/2012 |
| JP | 2012-503935 | 2/2012 |
| JP | 2013-162285 | 8/2013 |
| JP | 2015-019371 | 1/2015 |
| JP | 2015-198413 | 11/2015 |
| KR | 10-2015-0118855 | 10/2015 |
| KR | 10-2016-0018436 | 2/2016 |
| KR | 10-2016-0079788 | 7/2016 |
| WO | WO 2013/188464 | 12/2013 |
| WO | WO 2015/103578 | 7/2015 |

OTHER PUBLICATIONS

Non-Final Office Action for U.S. Appl. No. 17/517,625 dated Sep. 21, 2022.

Foreign Response to NZ Patent Appln. No. 743729 dated Sep. 28, 2022.

Foreign First Official Notification for IL Patent Appln. No. 283975 dated Jul. 11, 2022.

Foreign Exam Report for AU Patent Appln. No. 2022201783 dated Jul. 21, 2022.

Extended European Search Report dated Dec. 21, 2018 for European application No. 17748174.4, Applicant Magic Leap, Inc. 8 pages.

PCT International Search Report and Written Opinion for International Appln. No. PCT/US17/16263, Applicant Magic Leap, Inc., dated Jun. 5, 2017 (10 pages).

Restriction Requirement dated Dec. 10, 2018 for U.S. Appl. No. 15/243,415.

Response to Restriction Requirement and Preliminary Amendment filed Feb. 4, 2019 for U.S. Appl. No. 15/243,415.

Non-Final Office Action dated Mar. 25, 2019 for U.S. Appl. No. 15/423,415.

Amendment Response to Non-Final Office Action dated Jun. 25, 2019 for U.S. Appl. No. 15/423,415.

Non-Final Office Action dated Feb. 26, 2019 for U.S. Appl. No. 15/907,115.

Amendment Response to Non-Final Office Action dated Jun. 26, 2019 for U.S. Appl. No. 15/907,115.

(56) References Cited

OTHER PUBLICATIONS

PCT International Search Report and Written Opinion for International Appln. No. PCT/US2018/020020, Applicant Magic Leap, Inc., Forms PCT/ISA/210, 220 and 237, dated May 10, 2018 (25 pages).
Response to Extended European Search Report filed Jul. 18, 2019 for European application No. 17748174.4, Applicant Magic Leap, Inc. 22 pages.
Notice of Allowance dated Sep. 4, 2019 for U.S. Appl. No. 15/423,415.
Amendment after allowance filed Oct. 31, 2019 for U.S. Appl. No. 15/423,415.
Final Office Action dated Nov. 12, 2019 for U.S. Appl. No. 15/907,115.
Examination Report dated Oct. 28, 2019 for European application No. 17748174.4, Applicant Magic Leap, Inc. 6 pages.
Amendment/RCE Response to Office Action dated Feb. 12, 2020 for U.S. Appl. No. 15/907,115.
Extended European Search Report dated Feb. 14, 2020 for European application No. 18760949.0, Applicant Magic Leap, Inc. 12 pages.
Response to Examination Report filed Mar. 9, 2020 for European application No. 17748174.4, Applicant Magic Leap, Inc. 13 pages.
Notice of Allowance dated Mar. 16, 2020 for U.S. Appl. No. 15/907,115.
Foreign Office Action for Israeli Patent Application No. 260113 dated Mar. 15, 2020.
Foreign Office Action Response for Israeli Patent Application No. 260113 dated Jul. 13, 2020.
2nd Examination Report for EP Patent Appln. No. 17748174.4 dated Jul. 17, 2020.
Response to EESR for EP Patent Appln. No. 18760949.0 dated Sep. 14, 2020.
Foreign Response for EP Patent Appln. No. 17748174.4 dated Nov. 17, 2020.
Foreign OA for CN Patent Appln. No. 201780009744.1 dated Jan. 6, 2021.
Foreign 1st Exam Report for AU Patent Appln. No. 2017215349 dated Jan. 12, 2021.
Foreign OA for JP Patent Appln. No. 2018-539378 dated Feb. 24, 2021.
Foreign NOA for IL Patent Appln. No. 260113 dated Mar. 18, 2021.
Foreign OA for KR Patent Appln. No. 10-2019-7028175 dated Mar. 22, 2021.
Foreign OA for JP Patent Appln. No. 2019-546368 dated Mar. 29, 2021.
Foreign Exam Report for AU Patent Appln. No. 2018227710 dated Mar. 31, 2021.
Foreign OA for JP Patent Appln. No. 2020-24915 dated Apr. 7, 2021.
Foreign Response for CN Patent Appln. No. 201780009744.1 dated Apr. 27, 2021.
Foreign Response for JP Patent Appln. No. 2018-539378 dated May 17, 2021.
Foreign Resonse for KR Patent Appln. No. 10-2019-7028175 dated May 21, 2021.
Foreign NOA for JP Patent Appln. No. 2018-539378 dated May 26, 2021.
Foreign Response to JP Patent Appln. No. 2019-546368 dated Jun. 16, 2021.
Foreign Response for JP Patent Appln. No. 2020-24915 dated Jul. 6, 2021.
Foreign NOA for KR Patent Appln. No. 10-2019-7028175 dated Jun. 28, 2021.
Non-Final Office Action for U.S. Appl. No. 16/698,794 dated Jul. 14, 2021.
Foreign Summons Proceedings for EP Patent Appln. No. 17748174.4 dated Jul. 1, 2021.
Notice of Allowance for U.S. Appl. No. 16/902,650 dated Jul. 22, 2021.
Foreign OA for CN Patent Appln. No. 201780009744.1 dated Jul. 28, 2021.
Foreign NOA for JP Patent Appln. No. 2019-546368 dated Sep. 13, 2021.
Foreign Resonse for CN Patent Appln. No. 201780009744.1 dated Sep. 22, 2021.
Amendment Response to NFOA for U.S. Appl. No. 16/698,794 dated Oct. 12, 2021.
Foreign NOA for IL Patent Appln. No. 268397 dated Aug. 15, 2021.
Foreign NOA for CN Patent Appln. No. 201780009744.1 dated Oct. 13, 2021.
Foreign OA for KR Patent Appln. No. 10-2021-7031142 dated Oct. 28, 2021.
Foreign OA for IN Patent Appln. No. 201847031684 dated Oct. 26, 2021.
Foreign Response for AU Patent Appln. No. 2017215349 dated Nov. 24, 2021.
Foreig OA for JP Patent Appln. No. 2020-24915 dated Nov. 17, 2021.
Foreign Response for KR Patent Appln. No. 10-2021-7031142 dated Dec. 28, 2021.
Foreign Exam Report for IN Patent Appln. No. 201947036129 dated Jan. 14, 2022.
Final Office Action for U.S. Appl. No. 16/698,794 dated Jan. 21, 2022.
Foreign FOA for KR Patent Appln. No. 10-2021-7031142 dated Feb. 8, 2022 (with English translation).
Foreign Response for AU Patent Appln. No. 2018227710 dated Feb. 11, 2022.
Foreign Response for KR Patent Appln. No. 10-2021-7031142 dated Mar. 11, 2022.
Foreign Exam Report for EP Patent Appln. No. 18760949.0 dated Feb. 23, 2022.
Foreign Exam Report for NZ Patent Appln. No. 743729 dated Mar. 28, 2022.
Foreign NOA for KR Patent Appln. No. 10-2019-7031142 dated Apr. 5, 2022.
Amendment After Final for U.S. Appl. No. 16/698,794 dated Apr. 19, 2022.
Notice of Allowance for U.S. Appl. No. 16/698,794 dated Apr. 29, 2022.
Foreign Decision to Grant for EP Patent Appln. No. 17748174.4 dated Jun. 17, 2022.
Foreign Response for EP Patent Appln. No. 18760949.0 dated Jul. 5, 2022.
Foreign Exam Report for AU Patent Appln. No. 2022204210 dated Jul. 7, 2022.
Foreign Response for IN Patent Appln. No. 201847031684 dated Jul. 23, 2022.
Foreign OA for JP Patent Appln. No. 2021-167529 dated Sep. 27, 2022 (with English translation).
Foreign Notice of Acceptance for NZ Patent Appln. No. 743729 dated Oct. 18, 2022.
Foreign Response for IL Patent Appln. No. 283975 dated Nov. 30, 2022.
Foreign NOA for IL Patent Appln. No. 288137 dated Nov. 27, 2022.
Amendment Response to NFOA for U.S. Appl. No. 17/517,625 dated Dec. 20, 2022.
Foreign Response for JP Patent Appln. No. 2021-167529 dated Dec. 26, 2022.
Notice of Allowance for U.S. Appl. No. 17/517,625 dated Jan. 25, 2023.
Foreign Response for KR Patent Appln. No. 10-2022-7023026 dated May 17, 2023.
Foreign Response for AU Patent Appln. No. 2022201783 dated May 26, 2023.
Foreign Response for AU Patent Appln. No. 2022204210 dated May 22, 2023.
Foreign Response for CN Patent Appln. No. 201880014388.7 dated Jun. 13, 2023.
Foreign Notice of Acceptance for AU Patent Appln. No. 2022204210 dated Jun. 15, 2023.

(56) References Cited

OTHER PUBLICATIONS

Foreign OA for CN Patent Appln. No. 202111504258.1 dated Jun. 28, 2023.
Foreign Notice of Acceptance for AU Patent Appln. No. 2022201783 dated Jun. 14, 2023.
Foreign OA for KR Patent Appln. No. 10-2022-7023026 dated Mar. 20, 2023.
Foreign OA for CN Patent Appln. No. 201880014388.7 dated Mar. 1, 2023.
Foreign NOA for JP Patent Appln. No. 2021-167529 dated Apr. 4, 2023.
Foreign Intent to Grant for EP Patent Appln. No. 18760949.0 dated Mar. 24, 2023.
Foreign Response to EESR for EP patent Appln. No. 22176653.8 dated Apr. 19, 2023.
Foreign NOA for CA Patent Appln. No. 3007511 dated Mar. 31, 2023.
Foreign NOA for IL Patent Appln. No. 283975 dated Jun. 27, 2023 in English.

* cited by examiner

TECHNIQUE FOR DIRECTING AUDIO IN AUGMENTED REALITY SYSTEM

CROSS-REFERENCE TO RELATED APPLICATION(S)

This application is a continuation of U.S. patent application Ser. No. 16/698,794 and entitled "TECHNIQUE FOR DIRECTING AUDIO IN AUGMENTED REALITY SYSTEM," filed on Nov. 27, 2019, which is a continuation of U.S. patent application Ser. No. 15/423,415 and entitled "TECHNIQUE FOR DIRECTING AUDIO IN AUGMENTED REALITY SYSTEM," filed on Feb. 2, 2017, which claims priority from U.S. Provisional Patent Application Ser. No. 62/291,363, entitled "TECHNIQUE FOR DIRECTING AUDIO IN AUGMENTED REALITY SYSTEM," filed on Feb. 4, 2016. The contents of the aforementioned patent applications are hereby expressly incorporated by reference in their entirety.

FIELD OF THE INVENTION

The present invention generally relates to head worn hearing aid devices, such as those that can be used in augmented reality environments.

BACKGROUND

Modern computing and display technologies have facilitated the development of systems for so-called "virtual reality" or "augmented reality" experiences, wherein digitally reproduced images or portions thereof are presented to a user in a manner where they seem to be, or may be perceived as, real. A virtual reality (VR) scenario typically involves presentation of digital or virtual image information without transparency to other actual real-world visual input, whereas an augmented reality (AR) scenario typically involves presentation of digital or virtual image information as an augmentation to visualization of the actual world around the end user.

For example, referring to FIG. 1, an augmented reality scene 4 is depicted wherein a user of an AR technology sees a real-world park-like setting 6 featuring people, trees, buildings in the background, and a concrete platform 8. In addition to these items, the end user of the AR technology also perceives that he "sees" a robot statue 10 standing upon the real-world platform 8, and a cartoon-like avatar character 12 flying by which seems to be a personification of a bumble bee, even though these elements 10, 12 do not exist in the real world. As it turns out, the human visual perception system is very complex, and producing a VR or AR technology that facilitates a comfortable, natural-feeling, rich presentation of virtual image elements amongst other virtual or real-world imagery elements is challenging.

VR and AR systems typically employ head-worn displays (or helmet-mounted displays, or smart glasses) that are at least loosely coupled to a user's head, and thus move when the end user's head moves. If the end user's head motions are detected by the display system, the data being displayed can be updated to take the change in head pose (i.e., the orientation and/or location of user's head) into account.

As an example, if a user wearing a head-worn display views a virtual representation of a three-dimensional (3D) object on the display and walks around the area where the 3D object appears, that 3D object can be re-rendered for each viewpoint, giving the end user the perception that he or she is walking around an object that occupies real space. If the head-worn display is used to present multiple objects within a virtual space (for instance, a rich virtual world), measurements of head pose can be used to re-render the scene to match the end user's dynamically changing head location and orientation and provide an increased sense of immersion in the virtual space.

Head-worn displays that enable AR (i.e., the concurrent viewing of real and virtual objects) can have several different types of configurations. In one such configuration, often referred to as a "video see-through" display, a camera captures elements of a real scene, a computing system superimposes virtual elements onto the captured real scene, and a non-transparent display presents the composite image to the eyes. Another configuration is often referred to as an "optical see-through" display, in which the end user can see through transparent (or semi-transparent) elements in the display system to view directly the light from real objects in the environment. The transparent element, often referred to as a "combiner," superimposes light from the display over the end user's view of the real world.

In order to enhance the VR/AR experience for the user, sound generated by real sound sources and/or sound generated by virtual sound sources may be conveyed to the user via speakers incorporated into or otherwise connected to the head-worn display. Whether the sound is generated from a real sound source or a virtual sound source, it is desirable to preferentially receive the sound in the direction in which the user is focused and/or at the distance at which the user is focused, so that the user only hears sounds from an object or objects in which he or she is interested. Although directional microphones can be associated with the head-worn display in order to preferentially receive sound arriving from a real or virtual sound source located in a particular direction and/or at a particular distance, while cancelling out noise from other sources, the direction and/or distance of the directional microphone's greatest sensitivity to sound sources may not necessarily correspond to the direction in which the user is focused and/or the distance at which the user is focused.

There, thus, is a need to preferentially receive and convey to the end user sound arriving from a real or virtual sound source on which a person is focused.

SUMMARY

In accordance with one aspect of the present inventions, a hearing aid for use by an end user is provided. The hearing aid comprises at least one sensor (e.g., a camera) configured for detecting a focus of the end user on a sound source, which may be real or virtual. In one embodiment, the sensor(s) is configured for detecting an angular position of an eye of the end user to detect a direction of the focus of the end user. In another embodiment, the sensor(s) is configured for detecting a convergence of eyes of the end user to detect a distance of the focus of the end user. In still another embodiment, the sensor(s) is configured for detecting an angular position of a head of the end user to detect the direction of the focus of the end user.

The hearing aid further comprises an adaptive microphone assembly configured for converting sounds into electrical signals, and a speaker configured for converting the electrical signals to sounds for perception by the end user. In one embodiment, the microphone assembly is configured for converting the sounds into electrical signals in accordance with one of a dipole, cardioid, super-cardioid, or hyper-cardioid pattern. In another embodiment, the microphone assembly comprises a phased array of microphone elements.

The hearing aid may optionally comprise a frame structure configured for being worn by the end user. The frame structure may carry the sensor, microphone assembly, and speaker.

The hearing aid further comprises a control subsystem configured for modifying the direction and/or distance of a greatest sensitivity of the adaptive microphone assembly based on the detected focus of the end user on the sound source. For example, the control subsystem may be configured for setting the greatest sensitivity of the adaptive microphone assembly to the direction and/or distance of the detected focus of the end user.

In accordance with a second aspect of the present inventions, a virtual image generation system for use by an end user is provided. The virtual image generation system comprises memory storing a three-dimensional scene, at least one sensor configured for detecting a focus of the end user on a sound source (which may be real or virtual), and a speaker configured for conveying sound to the end user. The hearing aid comprises at least one sensor (e.g., a camera) configured for detecting a focus of the end user on a sound source, which may be real or virtual. In one embodiment, the sensor(s) is configured for detecting an angular position of an eye of the end user to detect a direction of the focus of the end user. In another embodiment, the sensor(s) is configured for detecting a convergence of eyes of the end user to detect a distance of the focus of the end user. In still another embodiment, the sensor(s) is configured for detecting an angular position of a head of the end user to detect the direction of the focus of the end user. The virtual image generation system further comprises a control subsystem configured for causing the speaker to preferentially convey the sound originating from the sound source relative to other sound sources in response to the detection of the focus of the end user on the sound source.

If the sound source is real, the virtual image generation system may further comprise an adaptive microphone assembly configured for amplifying sound, in which case, the control subsystem may be configured for setting a greatest sensitivity of the adaptive microphone assembly to the direction and/or distance of the detected focus of the end user. The adaptive microphone assembly may, e.g., be configured for amplifying the sound in accordance with one of a dipole, cardioid, super-cardioid, or hyper-cardioid pattern. If the sound source is virtual, the three-dimensional scene may contain the virtual sound source, and the memory may store synthetic sound data in association with the virtual sound source of the three-dimensional scene. In this case, the control subsystem may be configured for identifying the virtual sound source from other sound sources in response to the detection of the focus of the end user on the virtual sound source, and causing the speaker to convey the sound to the end user in accordance with the synthetic sound data.

The control subsystem may further be configured for rendering a plurality of synthetic image frames of the three-dimensional scene, in which case, the virtual image generation system further comprises a display subsystem configured for sequentially displaying the plurality of image frames to the end user. The control subsystem may comprise a graphics control subsystem unit (GPU) configured for rendering the image frames. The display system may be configured for being positioned in front of the eyes of the end user. The display system may include a projection subsystem and a partially transparent display surface. In this case, the projection subsystem is configured for projecting the image onto the partially transparent display surface, and the partially transparent display surface is configured for being positioned in the field of view between the eyes of the end user and an ambient environment, thereby allowing the end user to visualize a three-dimensional augmented scene. The virtual image generation system may further comprise a frame structure configured for being worn by the end user. The frame structure may carry the sensor(s), the adaptive microphone assembly, the speaker, and the display subsystem.

In an optional embodiment, the control subsystem is configured for processing the electrical signals to localize the sounds, such that a sound originating from the real sound source is perceived by the end user as originating from the real sound source. In another optional embodiment, the control subsystem may be configured for processing the electrical signals to selectively raising or lowering a volume of certain frequency components of the sounds, such that a sound originating from the real sound source is emphasized and/or a sound originating from a different sound source is deemphasized. In still another optional embodiment, the control subsystem is configured for processing the electrical signals to compare characteristics of a first sound originating from the real sound source to characteristics of a second sound originating from a different source, emphasizing sounds having the same type of characteristics as the characteristics of the first sound, and deemphasizing sounds having the same type of characteristics as the second sound.

In accordance with a second aspect of the present inventions, the aforementioned hearing aid may be incorporated into a virtual image generation system, such as a virtual reality system or augmented reality system. In addition to the components of the hearing aid, the virtual image generation system further comprises memory storing a three-dimensional scene, and the control system is further configured for rendering a plurality of synthetic image frames of the three-dimensional scene. The virtual image generation system further comprises a display subsystem configured for sequentially displaying the plurality of image frames to the end user. The display system may be configured for being positioned in front of the eyes of the end user. The display system may include a projection subsystem and a partially transparent display surface. In this case, the projection subsystem is configured for projecting the image onto the partially transparent display surface, and the partially transparent display surface is configured for being position in the field of view between the eyes of the end user and an ambient environment, thereby allowing the end user to visualize a three-dimensional augmented scene. The control subsystem may comprise a graphics control subsystem unit (GPU) configured for rendering the image.

In an optional embodiment, the control subsystem is configured for instructing the display subsystem to display a visual indicator to the end user of the direction and/or distance that the end user is focused. In another optional embodiment, the control subsystem is configured for instructing the display subsystem to display a visual indicator to the end user of the direction and/or distance of the greatest sensitivity of the adaptive microphone assembly.

Additional and other objects, features, and advantages of the invention are described in the detail description, figures and claims.

BRIEF DESCRIPTION OF THE DRAWINGS

The drawings illustrate the design and utility of preferred embodiments of the present invention, in which similar elements are referred to by common reference numerals. In order to better appreciate how the above-recited and other advantages and objects of the present inventions are obtained, a more particular description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

The description that follows relates to display systems and methods to be used in an augmented reality system. However, it is to be understood that the while the invention lends itself well to applications in augmented reality systems, the invention, in its broadest aspects, may not be so limited. For example, the invention can be applied to virtual reality systems, as well as other head-worn hearing aid devices that do not utilize displays for presenting a virtual or augmented reality experience to the user. Thus, while often described herein in terms of an augmented reality system, the teachings should not be limited to such systems of such uses.

Figure 1:
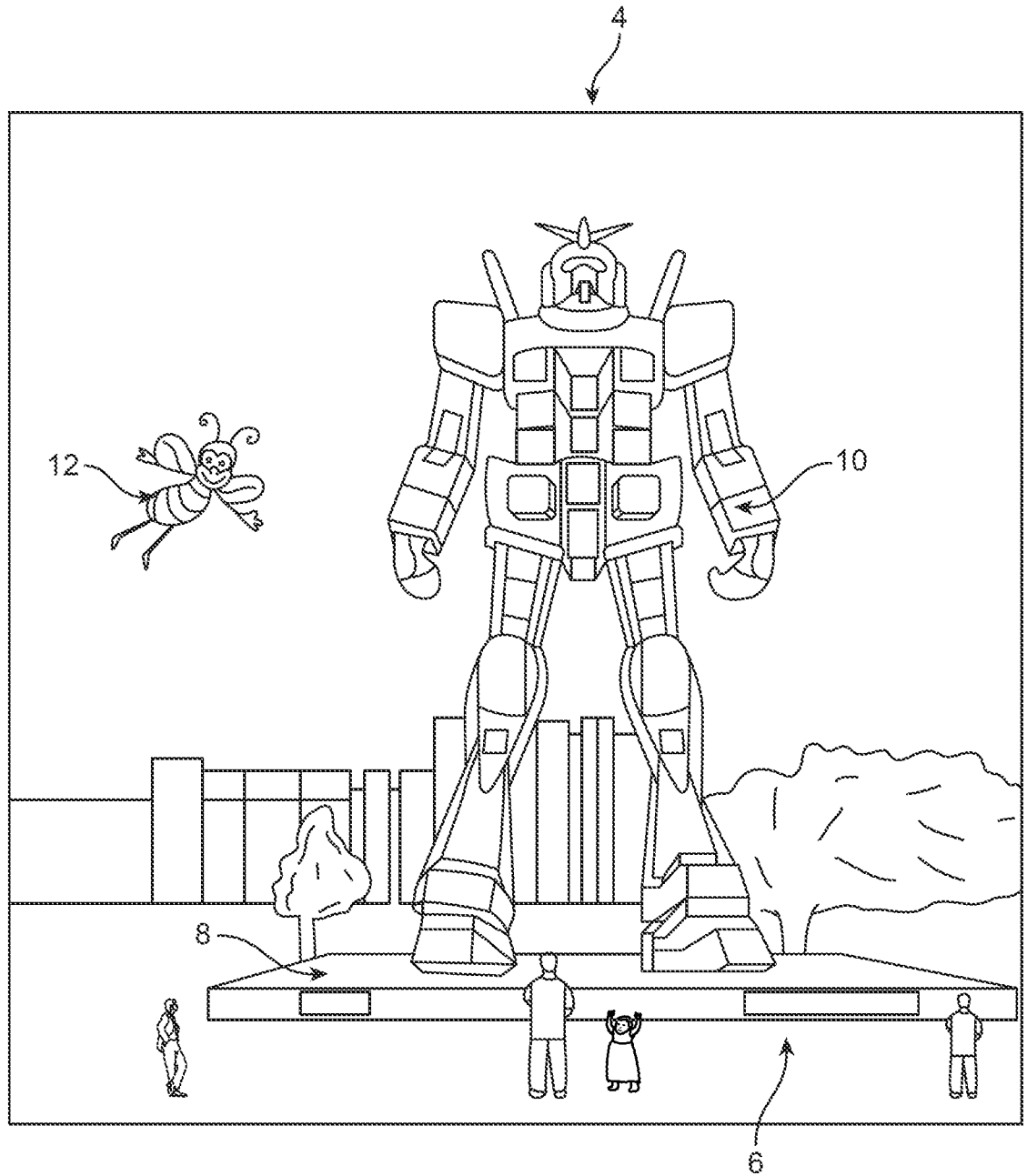
FIG. 1 is a picture of a three-dimensional augmented reality scene that can be displayed to an end user by a prior art augmented reality generation device.
Figure 2:
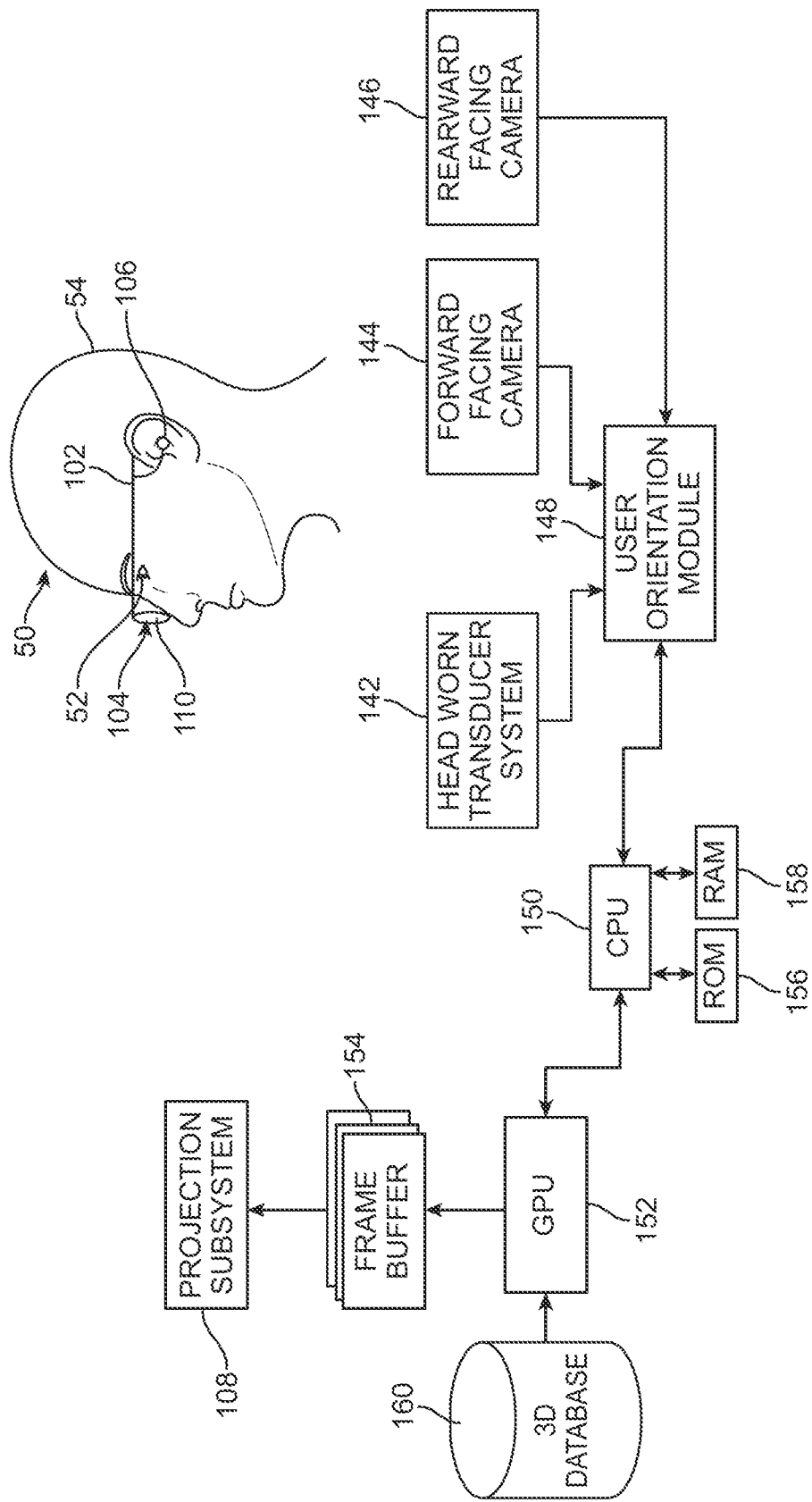
FIG. 2 is a block diagram of an augmented reality system constructed in accordance with one embodiment of the present inventions.

Referring to FIG. 2, one embodiment of an augmented reality system 100 constructed in accordance with present inventions will now be described. The augmented reality system 100 may be operated as an augmented reality subsystem, providing images of virtual objects intermixed with physical objects in a field of view of an end user 50. There are two fundamental approaches when operating the augmented reality system 100. A first approach employs one or more imagers (e.g., cameras) to capture images of the ambient environment. The augmented reality system 100 inter-mixes the virtual images into the data representing the images of the ambient environment. A second approach employs one or more at least partially transparent surfaces through which the ambient environment can be seen and on to which the augmented reality system 100 produces images of virtual objects.

At least for augmented reality applications, it may be desirable to spatially position various virtual objects relative to respective physical objects in a field of view of the end user 50. Virtual objects, also referred to herein as virtual tags or tag or call outs, may take any of a large variety of forms, basically any variety of data, information, concept, or logical construct capable of being represented as an image. Non-limiting examples of virtual objects may include: a virtual text object, a virtual numeric object, a virtual alpha-numeric object, a virtual tag object, a virtual field object, a virtual chart object, a virtual map object, a virtual instrumentation object, or a virtual visual representation of a physical object.

More pertinent to the present inventions, the augmented reality system 100 is configured for coupling the focus of the end user to the preferentially reception of sound along a direction and/or at a distance, so that the end user hears the sound that is most relevant to the end user. In particular, the augmented reality system 100 detects a focus of the end user on a sound source, and preferentially conveys the sound originating from that sound source to the end user based on the detected focus of the end user, e.g., by setting the direction and/or distance of the preferential reception of sounds to the detected focus of the end user (i.e., towards and/or at the sound source on which the end user is focused).

To this end, the augmented reality system 100 comprises a frame structure 102 worn by an end user 50, a display system 104 carried by the frame structure 102, such that the display system 104 is positioned in front of the eyes 52 of the end user 50, and a speaker 106 incorporated into or connected to the display system 104. In the illustrated embodiment, the speaker 106 is carried by the frame structure 102, such that the speaker 106 is positioned adjacent (in or around) the ear canal of the end user 50, e.g., an earbud or headphone. Optionally, another speaker (not shown) is positioned adjacent the other ear canal of the end user 50 to provide for stereo/shapeable sound control. Although the speaker 106 is described as being positioned adjacent the ear canal, other types of speakers that are not located adjacent the ear canal can be used to convey sound to the end user 50. For example, speakers may be placed at a distance from the ear canal, e.g., using a bone conduction technology.

The augmented reality system 100 further comprises an adaptive microphone assembly 107 that converts sounds in the ambient environment to electrical signals that are then delivered to the speaker(s) 106, which in turn converts the electrical signals back to sounds that are then played back to the end user 50. As will be discussed in further detail below, the microphone assembly 107 preferentially receives sound in a particular direction and/or at a particular distance that corresponds to the direction and distance that the end user 50 is focused, thereby allowing the end user 50 to focus on the sound that is most relevant to the user at any particular time in the context of an augmented reality scene. As such, the microphone assembly 107 not only allows the end user 50 to more clearly hear the relevant sounds, it directs the attention of the end user 50 to the more relevant sounds, thereby enhancing the effectiveness of the experience. In the illustrated embodiment, the microphone assembly 107 is mounted to the arms of the frame structure 102.

The display system 104 is designed to present the eyes 52 of the end user 50 with photo-based radiation patterns that can be comfortably perceived as augmentations to physical reality, with high-levels of image quality and three-dimensional perception, as well as being capable of presenting two-dimensional content. The display system 104 presents a sequence of frames at high frequency that provides the perception of a single coherent scene. To this end, the display subsystem 104 comprises a projection subsystem 108 and a partially transparent display screen 110 on which the projection subsystem 108 projects images. The display screen 110 is positioned in the end user's 50 field of view between the eyes 52 of the end user 50 and an ambient environment.

In the illustrated embodiment, the projection subsystem 108 takes the form of an optical fiber scan-based projection device, and the display screen 110 takes the form of a waveguide-based display into which the scanned light from the projection subsystem 108 is injected to produce, e.g., images at single optical viewing distance closer than infinity (e.g., arm's length), images at multiple, discrete optical viewing distances or focal planes, and/or image layers stacked at multiple viewing distances or focal planes to represent volumetric 3D objects. These layers in the light field may be stacked closely enough together to appear continuous to the human visual subsystem (i.e., one layer is within the cone of confusion of an adjacent layer). Additionally or alternatively, picture elements may be blended across two or more layers to increase perceived continuity of transition between layers in the light field, even if those layers are more sparsely stacked (i.e., one layer is outside the cone of confusion of an adjacent layer). The display subsystem 104 may be monocular or binocular.

Figure 3:
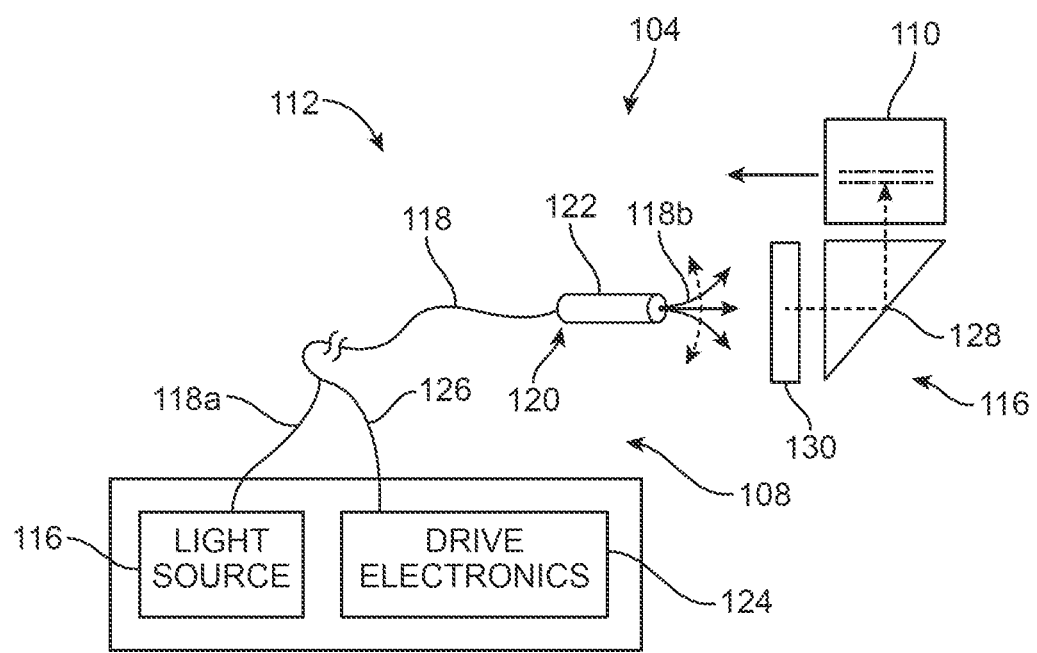
FIG. 3 is a plan view of one embodiment of a display subsystem for use in the augmented reality system of FIG. 2.
Figure 4:
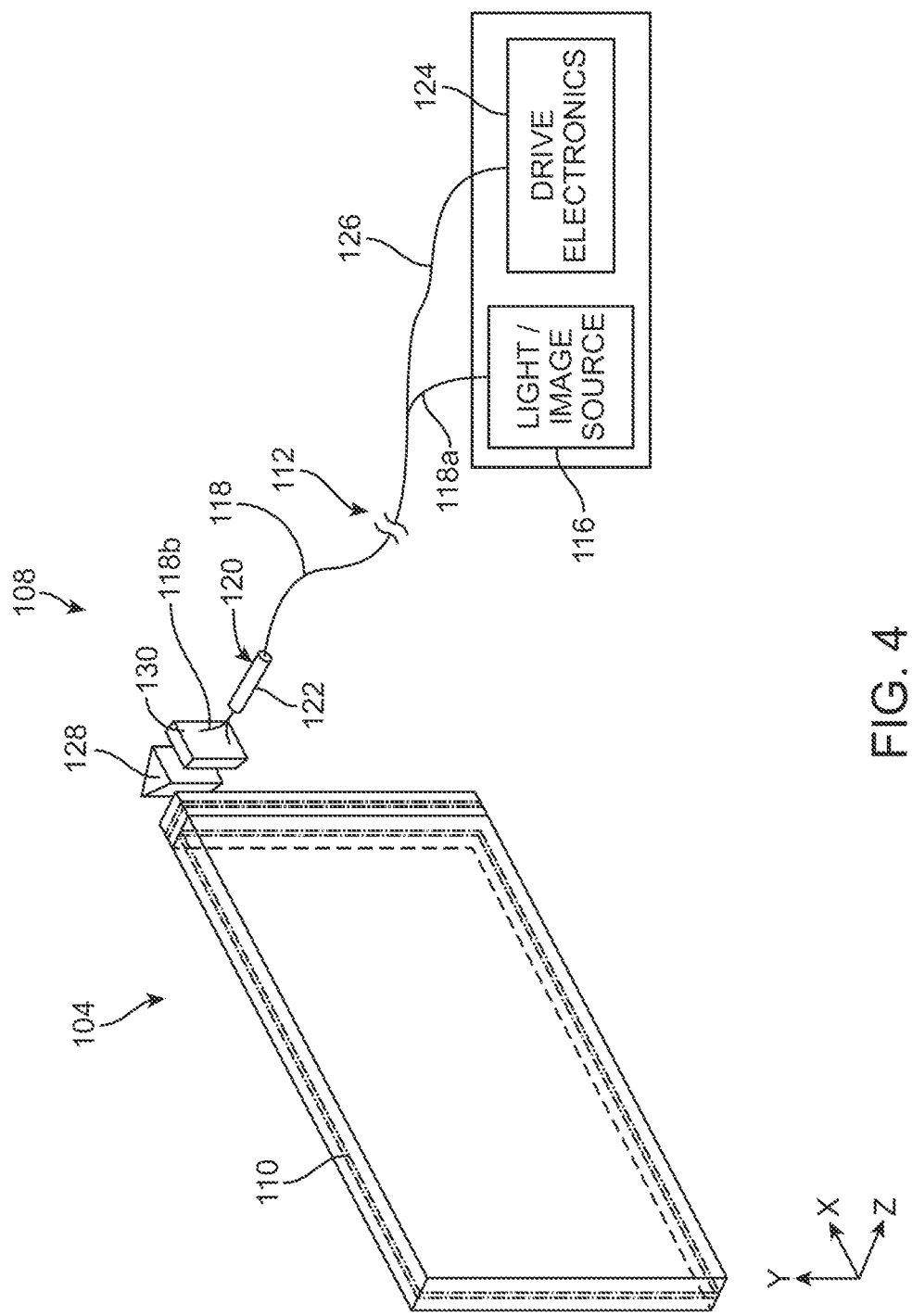
FIG. 4 is perspective view of one embodiment of a display subsystem for use in the augmented reality system of FIG. 2.

Referring to FIGS. 3 and 4, the projection subsystem 108 includes a scanning assembly 112 that generates and scans a light beam in a predetermined scan pattern in response to control signals, and an optical coupling subsystem 114 that couples the light beam from the scanning assembly 114 into the display screen 110.

The scanning assembly 112 comprises one or more light sources 116 (only one shown for purposes of simplicity) that produces the light beam (e.g., emits light of different colors in defined patterns). The light source 116 may take any of a large variety of forms, for instance, a set of RGB lasers (e.g., laser diodes capable of outputting red, green, and blue light) operable to respectively produce red, green, and blue coherent collimated light according to defined pixel patterns specified in respective frames of pixel information or data. Laser light provides high color saturation and is highly energy efficient.

The scanning assembly 112 further comprises one or more optical fibers 118 (only one shown for purposes of simplicity), each of which has a proximal end 118a into which a light beam is received from the light source 116 and a distal end 118b from which the light beam is provided to the partially transparent display screen 110. The scanning assembly 112 further comprises a mechanical drive assembly 120 to which the optical fiber 118 is mounted. The drive assembly 120 is configured for displacing the distal end 118b of the optical fiber 118, and in the illustrated embodiment, comprises a piezoelectric element 122 to which the optical fiber 118 is mounted.

The scanning assembly 112 further comprises drive electronics 124 configured for conveying electrical signals to the piezoelectric element 122, thereby causing the distal ends 118b of the optical fiber 118 to vibrate in accordance with the scan pattern. Thus, operation of the light source 116 and drive electronics 124 are coordinated in a manner that generates image data that is encoded in the form of light that is spatially and/or temporally varying.

In the illustrated embodiment, the piezoelectric element 122 takes the form of a hollow tube, in which case, the distal end 118b of the optical fiber 118 is threaded or received through the piezoelectric tube 122. The distal end 118b of the optical fiber 118 protrudes from the piezoelectric tube 122 as a fixed-free flexible cantilever. The piezoelectric tube 122 is associated with four quadrant electrodes (not illustrated). The electrodes may, for example, be plated on the outside, outer surface or outer periphery or diameter of the piezoelectric tube 122. A core electrode (not illustrated) is also located in a core, center, inner periphery or inner diameter of the tube 122.

The drive electronics 124 are electrical coupled via wires 126 to drive opposing pairs of electrodes (not shown) to bend the piezoelectric tube 122 in two axes independently. The protruding distal end 118b of the optical fiber 118 has mechanical modes of resonance. The frequencies of resonance depend upon a diameter, length, and material properties of the optical fiber 118. By vibrating the piezoelectric tube 122 near a first mode of mechanical resonance, the fiber distal end 118b is caused to vibrate, and can sweep through large deflections about a fulcrum. Alternatively, the piezoelectric tube 122 may be vibrated near a higher order mode (e.g., second order mode) of mechanical resonance, such that the fiber distal end 118b sweeps through smaller deflections about a fulcrum.

By stimulating resonant vibration in two axes, the fiber distal end 118 is scanned biaxially in an area filling 2D scan. By modulating an intensity of the light source 116 in synchrony with the scan of the fiber distal end 118b, a light beam emerging from the optical fiber 118 forms an image. Descriptions of such a set up are provided in U.S. patent application Ser. No. 13/915,530, International Patent Application Ser. No. PCT/US2013/045267, and U.S. Provisional Patent Application Ser. No. 61/658,355, all of which are incorporated by reference herein in their entireties.

The optical coupling subsystem 116 includes an optical waveguide input apparatus 128, for instance, one or more reflective surfaces, diffraction gratings, mirrors, dichroic mirrors, or prisms to optically couple light into the end of the display screen 110. The optical coupling subsystem 116 further includes a collimation element 130 that collimates light from the optical fiber 118. Optionally, the optical coupling subsystem 116 comprises an optical modulation apparatus (not shown) configured for converging the light from the collimation element 130 towards a focal point in the center of the optical waveguide input apparatus 128, thereby allowing the size of the optical waveguide input apparatus 128 to be minimized, as discussed in further details in U.S. Provisional Patent Application Ser. No. 62/238,052, entitled "Virtual/Augmented Reality System Having Reverse Angle Diffraction Grating," which is expressly incorporated herein by reference. Each of the optical fibers 118 may combine the advantages of polarization-maintaining (PM) optical fibers with those of non-PM optical fibers to ensure that the linearly polarization of the light beam propagating through the respective optical fiber 118 is maintained, while maintaining the mechanical properties of the portion of the optical fiber 118 associated with the scanning device 114, as discussed in U.S. Provisional Patent Application Ser. No. 62/280,992, entitled "Polarizing Maintaining Optical Fiber in Virtual/Augmented Reality System", which is expressly incorporated herein by reference.

Figure 5:
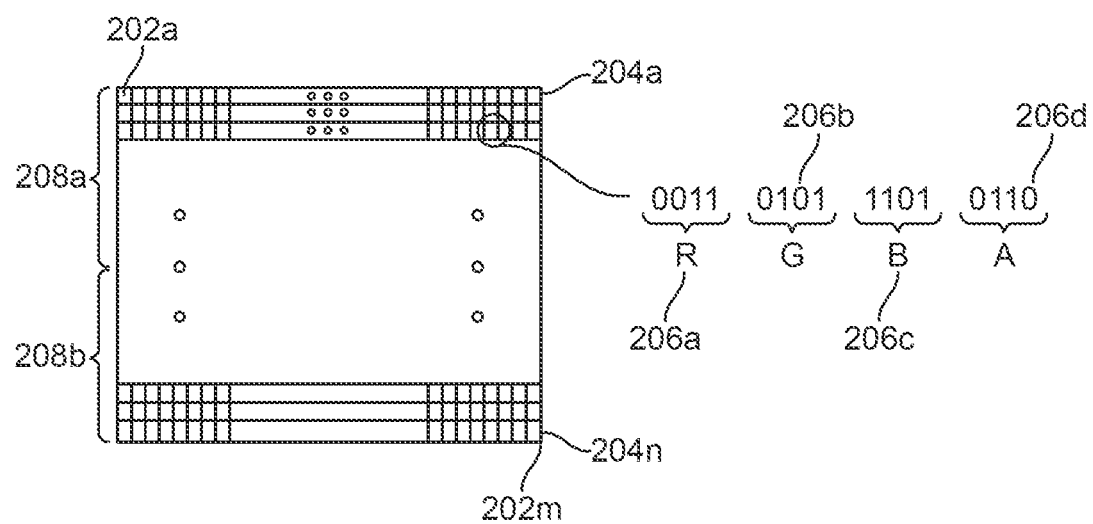
FIG. 5 is a plan view of an exemplary frame generated by the augmented reality system of FIG. 2.
Figure 6A:
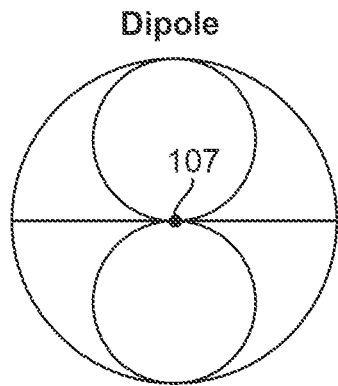
FIG. 6a is a plan view of a dipole pattern that can be formed by a microphone assembly for use in the augmented reality system of FIG. 2.
Figure 6B:
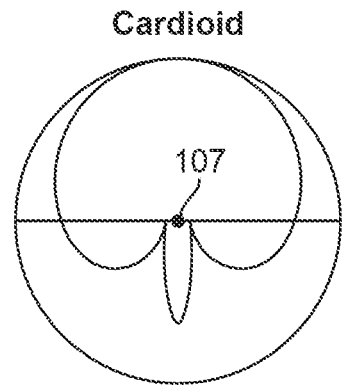
FIG. 6b is a plan view of a cardioid pattern that can be formed by a microphone assembly for use in the augmented reality system of FIG. 2.
Figure 6C:
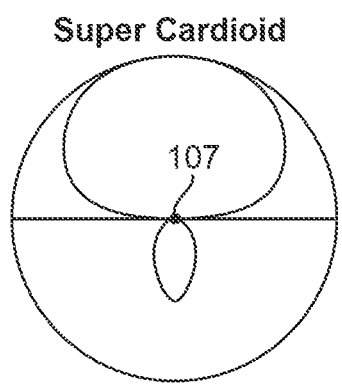
FIG. 6c is a plan view of a super-cardioid pattern that can be formed by a microphone assembly for use in the augmented reality system of FIG. 2.
Figure 6D:
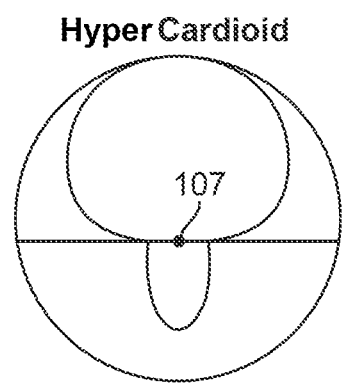
FIG. 6d is a plan view of a hyper-cardioid pattern that can be formed by a microphone assembly for use in the augmented reality system of FIG. 2.

Thus, the display subsystem 104 generates a series of synthetic image frames of pixel information that present an undistorted image of one or more virtual objects to the user. For example, referring to FIG. 5, a synthetic image frame 200 is schematically illustrated with cells 202a-202m divided into horizontal rows or lines 204a-204n. Each cell 202 of the frame 200 may specify values for each of a plurality of colors for the respective pixel to which the cell 202 corresponds and/or intensities. For instance, the frame 200 may specify one or more values for red 206a, one or more values for green 206b, and one or more values for blue 206c for each pixel. The values 206 may be specified as binary representations for each of the colors, for instance, a respective 4-bit number for each color. Each cell 202 of the frame 200 may additionally include a value 206d that specifies an amplitude.

The frame 200 may include one or more fields, collectively 208. The frame 200 may consist of a single field. Alternatively, the frame 200 may comprise two, or even more fields 208a-208b. The pixel information for a complete first field 208a of the frame 200 may be specified before the pixel information for the complete second field 208b, for example occurring before the pixel information for the second field 208b in an array, an ordered list or other data structure (e.g., record, linked list). A third or even a fourth field may follow the second field 208b, assuming a presentation subsystem is configured to handle more than two fields 208a-208b.

Further details describing display subsystems are provided in U.S. Provisional Patent Application Ser. No. 61/801,219, entitled "Display System and Method", and U.S. Utility patent application Ser. No. 14/331,218, entitled "Planar Waveguide Apparatus With Diffraction Element(s) and Subsystem Employing Same", which are expressly incorporated herein by reference.

Referring back to FIG. 2, the augmented reality system 100 further comprises one or more sensors (not shown) mounted to the frame structure 102 for detecting the position and movement of the head 54 of the end user 50 and/or the eye position and inter-ocular distance of the end user 50. Such sensor(s) may include image capture devices (such as cameras), microphones, inertial measurement units, accelerometers, compasses, GPS units, radio devices, and/or gyros.

For example, in one embodiment, the augmented reality system 100 comprises a head worn transducer subsystem 142 that includes one or more inertial transducers to capture inertial measures indicative of movement of the head 54 of the end user 50. Such may be used to sense, measure, or collect information about the head movements of the end user 50. For instance, such may be used to detect measurement movements, speeds, acceleration, and/or positions of the head 54 of the end user 50.

The augmented reality system 100 further comprises one or more forward facing cameras 144, which may be used to capture information about the environment in which the end user 50 is located. The forward facing camera(s) 144 may be used to capture information indicative of distance and orientation of the end user 50 with respect to that environment and specific objects in that environment. When head worn, the forward facing camera(s) 144 is particularly suited to capture information indicative of distance and angular position (i.e., the direction in which the head is pointed) of the head 54 of the end user 50 with respect to the environment in which the end user 50 is located and specific objects in that environment. The forward facing camera(s) 144 may, for example, be employed to detect head movement, speed, and/or acceleration of head movements. The forward facing camera(s) 144 may, for example, be employed to detect or infer a center of attention of the end user 50, for example, based at least in part on an orientation of the head 54 of the end user 50. Orientation may be detected in any direction (e.g., up/down, left, right with respect to the reference frame of the end user 50).

The augmented reality system 100 further comprises a pair of rearward facing cameras 146 to track angular position (the direction in which the eye or eyes are pointing), blinking, and depth of focus (by detecting eye convergence) of the eyes 52 of the end user 50. Such eye tracking information may, for example, be discerned by projecting light at the end user's eyes, and detecting the return or reflection of at least some of that projected light. Further details discussing eye tracking devices are provided in U.S. Patent Application Ser. No. 61/801,219, entitled "Display System and Method," U.S. Patent Application Ser. No. 62/005,834, entitled "Methods and Subsystem for Creating Focal Planes in Virtual and Augmented Reality," and U.S. Patent Application Ser. No. 61/776,771, entitled "Subsystem and Method for Augmented and Virtual Reality," which are expressly incorporated herein by reference.

The augmented reality system 100 further comprises a user orientation detection module 148. The user orientation module 148 detects the instantaneous position of the head 54 of the end user 50 and may predict the position of the head 54 of the end user 50 based on position data received from the sensor(s). The user orientation module 148 also tracks the eyes 52 of the end user 50, and in particular the direction and/or distance at which the end user 50 is focused based on the tracking data received from the sensor(s).

The augmented reality system 100 further comprises a control subsystem that may take any of a large variety of forms. The control subsystem includes a number of controllers, for instance one or more microcontrollers, microprocessors or central processing units (CPUs), digital signal processors, graphics processing units (GPUs), other integrated circuit controllers, such as application specific integrated circuits (ASICs), programmable gate arrays (PGAs), for instance field PGAs (FPGAs), and/or programmable logic controllers (PLUs).

In the illustrated embodiment, the control subsystem comprises a digital signal processor (DSP) (described below with respect to the microphone assembly 107), a central processing unit (CPU) 150, a graphics processing unit (GPU) 152, and one or more frame buffers 154. The CPU 150 controls overall operation, while the GPU 152 renders frames (i.e., translating a three-dimensional scene into a two-dimensional image) and stores these frames in the frame buffer(s) 154. While not illustrated, one or more additional integrated circuits may control the reading into and/or reading out of frames from the frame buffer(s) 154 and operation of the scanning device of the display subsystem 104. Reading into and/or out of the frame buffer(s) 154 may employ dynamic addressing, for instance, where frames are over-rendered. The augmented reality system 100 further comprises a read only memory (ROM) 156 and a random access memory (RAM) 158. The augmented reality system 100 further comprises a three-dimensional data base 160 from which the GPU 152 can access three-dimensional data of one or more scenes for rendering frames, as well as synthetic sound data associated with virtual sound sources contained within the three-dimensional scenes.

More significant to the present inventions, the control subsystem is configured for causing the speaker 106 to preferentially convey the sound originating from the sound source (which may real or virtual) relative to other sound sources in response to the detection of the focus of the end user 50 on the sound source. In the case where the sound source on which end user 50 is focused is real, the control subsystem is configured for setting a greatest sensitivity of the adaptive microphone assembly 107 to the direction and/or distance of the detected focus of the end user 50.

The adaptive microphone assembly 107 is capable of preferentially receiving sound in a particular direction relative to other sounds. For example, the microphone assembly 107 may have a conventional polar pattern, e.g., dipole, cardioid, supercardioid, or hypercardioid, as illustrated in FIGS. 6a-6d. The microphone assembly 107 is, however, capable of dynamically modifying the polar pattern based on the direction in which the end user 50 is focused. In other words, the greatest sensitivity of the microphone assembly 107 along a direction and/or at a distance may be modified.

Figure 7:
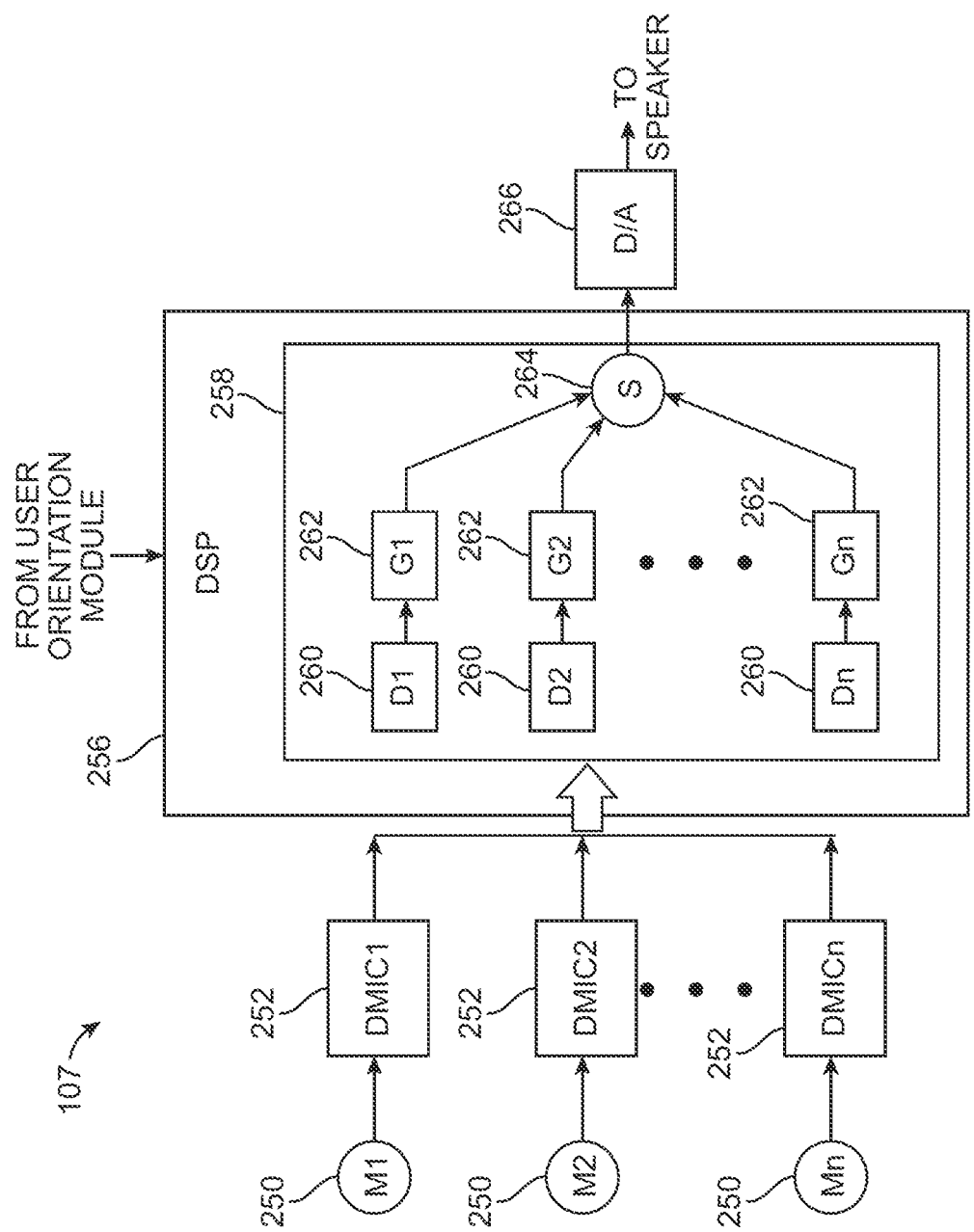
FIG. 7 is a schematic of an adaptive microphone assembly for use by the augmented reality system of FIG. 2.

To this end, and with reference to FIG. 7, the microphone assembly 107 comprises a phased array of microphone elements 250 (in this case, microphone elements M1-Mn), each of which is configured for detecting and converting ambient sound signals into an audio signal. In the illustrated embodiment, the microphone elements 118 are digital in nature, and thus, convert the ambient sound signal into digital audio signals, and in this case pulse density modulation (PDM) signals. Preferably, the microphone elements 250 are spatially spaced from each other to maximize directionality of the microphone assembly 107. For example, as shown in FIG. 2, two of the microphone elements 250 may be mounted to each arm of the frame structure 102, although more than two, such as four microphone elements 250 may be mounted to each arm of the frame structure 106.

The microphone assembly 107 further comprises a plurality of digital microphone interfaces (DMICs) 252 (in this case, DMIC1-DMICn, one for each microphone element M) that are configured for respectively receiving the respective audio signals from the corresponding microphone elements 250 and performing a digital filter operation referred to as "decimation" to convert the digital audio signals from the PDM format to a more easily manipulatable pulse code modulation (PCM). Each of the DMICs 190 also performs fixed gain control on the digital audio signals.

The microphone assembly 107 further comprises a digital signal processor (DSP) 256, which comprises an audio processing module 258 configured for processing the digital audio signals output by the gain amplifiers 254, and outputting a directional audio signal that preferentially represents sound received by the microphone assembly 116. To this end, the audio processing module 258 comprises processing parameters in the form of a plurality of delay elements 260 (in this case, delay elements D1-Dn, one for each microphone element M), a plurality of gain elements 262 (in this case, gain elements G1-Gn, one for each microphone element M), and a summer 264. The delay elements 260 respectively apply delay factors to the amplified digital signals received from the corresponding gain amplifiers 254 of the microphone assembly 107, and the gain elements 262 respectively apply gain factors to the delayed digital signals. The summer 264 (S) adds the gain adjusted and delayed signals to generate a digital audio signal that is transformed into an analog audio signal via a digital-to-analog (D/A) converter 266 and transmitted to the speaker(s) 106 for output to the end user 50 as a discernible sound.

The microphone elements 250 are spatially arranged and the delay elements 260 and gain elements 262 are set in a manner that results in the receipt of ambient sound in accordance with a directional polar pattern (i.e., sounds arriving from a particular angular direction or directions will be emphasized more than sounds arriving from other angular directions). Significantly, the directionality of the microphone element array 250 is modified based on the detected focus of the end user 50, e.g., the direction at which the microphone element array 250 preferentially receives the sound may be set along the direction of the detected focus of the end user 50. To this end, the DSP 256 receives orientation data from the user orientation detection module 148 indicative of the direction in which the user 50 is focused. For example, the orientation data may correspond to the angular position of the eye 52 detected by the rearward facing camera(s) 146 or the angular position of the head 54 detected by the forward-facing camera(s) 144.

Figure 8A:
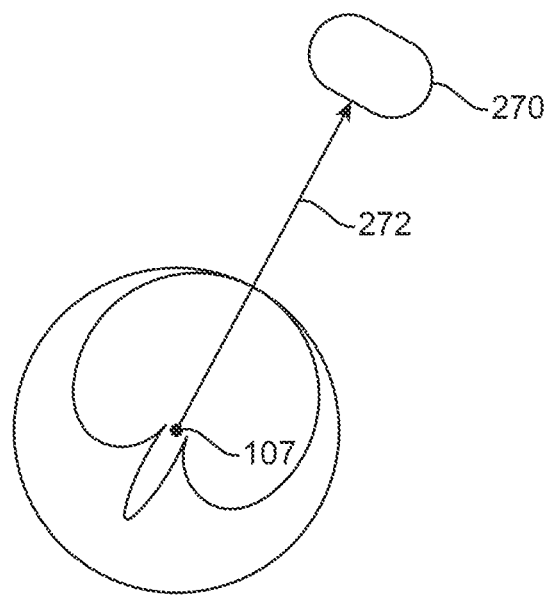
FIG. 8a is a plan view of a direction of greatest sensitivity of the microphone assembly that corresponds to an object focused on by a user.
Figure 8B:
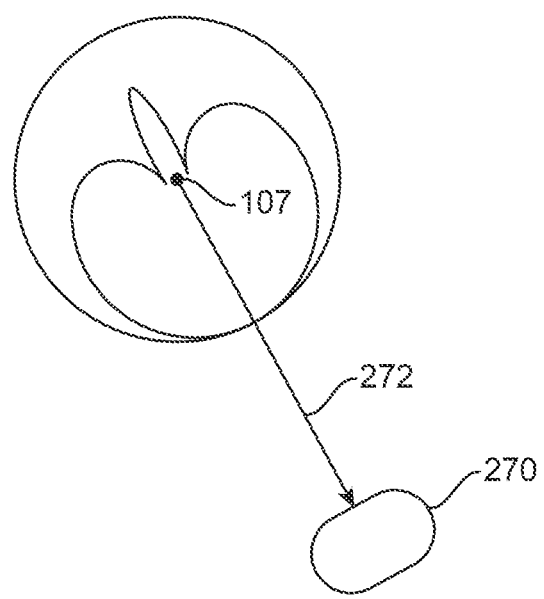
FIG. 8b is a plan view of another direction of greatest sensitivity of the microphone assembly that corresponds to an object focused on by a user.

For example, with reference to FIGS. 8a and 8b, if the polar pattern of the phased array of microphone elements 250 is a cardioid pattern, and the end user 50 is focused on a real sound source 270 along a particular direction 272, the DSP 256 will set the delay elements 260 and gain elements 262 in a manner that modifies the directionality of the microphone element array 250, and in this case, the axis of the main lobe of the cardioid pattern is aligned with the direction in which the end user 50 is focused on the sound source 270.

Although the microphone element array 250 has been described as having a sensitivity that can be set to correspond to the focal direction received from the user orientation detection module 248, the microphone element array 250 may be arranged in a manner that allows its sensitivity to be set to correspond with the focal distance received from the user orientation detection module 248. In particular, the microphone elements 250 may be arranged in a straight line, such that the microphone elements 250 will all be at different distances from the sound source 270. Delays can be introduced into the microphone elements 250 via the delay elements 260 to effectively and selectively move the microphone elements 250 respectively "closer to or further from" the sound source 270. This can be accomplished in a way that effectively locates the microphone elements 250 equidistant from the sound source 270. Any sound originating from the sound source 270 will simultaneously impinge on the microphone elements 250, whereas sound originating from other sound sources will not impinge on the microphone elements 250 at different times, thereby maximizing the sensitivity of the microphone element array 250 at the location of the sound source 270.

It should be noted that although the microphone elements 250 are described as being digital, the microphone elements 250 may alternatively be analog. Furthermore, although the delay elements 260, gain elements 262, and summer 264 are disclosed and illustrated as being software components that reside within the DSP 256, any one or more of the delay elements 260, gain elements 262, and summer 264 may comprise analog hardware components that reside outside of, but under control of, the DSP 256.

To facilitate a dynamic modification of the directionality and distance of the microphone element array 250, different sets of values for the delay elements 260 and gain elements 262 and corresponding directions and distances of the microphone element array 250 may be stored in memory for access by the DSP 256. That is, the DSP 256 matches the focal direction and/or focal distance received from the user orientation detection module 248 with the closest directional and/or distance value stored in memory, and selects the corresponding set of values for the delay elements 260 and gain elements 262 for that selected direction/distance.

In the case where the sound source on which end user 50 is focused is virtual, the adaptive microphone assembly 107 is not utilized. Instead, the control subsystem is configured for identifying the virtual sound source from other sound sources (either real or virtual) in response to the detection of the focus of the end user 50 on the virtual sound source, and causing the speaker 106 to convey the sound to the end user 50 in accordance with the synthetic sound data. The sound heard by the end user 50 will naturally appear to originate from the virtual sound source.

The DSP 256 may additionally use the positional information of the sound source to process the sound signals to achieve increased focus, increased discernment of sounds, and increased intelligibility of verbal subject matter. That is, because the sensors provide better information about the location and nature of the sound source, as well as the actual environment, while the database 160 provides information of the "persistent world," and can therefore inform how the sound signals can be rendered to the end user 50 in a manner that increases attention on the desired sound source. For instance, artificial sounds can be made very appropriate to the environment or room, and therefore, realistic and easy to concentrate on, or artificial or real sounds can be made unnatural, thereby standing out in a manner that contrasts with other sounds, and attracting attention, e.g., changing the pitch or adding an "announcer megaphone" effect.

For example, in the case where multiple speakers 106 are used, the focus of the end user 50 on the relevant sound and/or the ability of the end user 50 to hear and/or discern that relevant sound may be increased by localizing the received sounds, e.g., by playing the sound back through the speakers 106 in such a way as to make it appear to the end user 50 that the sounds are originating from the locations of the sound sources, so as to affect clarity or realism of the sound. The sounds can be localized using in one or more of various techniques. To add to the sense of directionality, especially for virtual sound not originating in the real world, the DSP 256 may appropriately shape the tonality of the played back sounds and/or add appropriate reflections, occlusion, or obstruction to fit the real or virtual aspects of a room shape or environment.

Optionally, the sound originating from the focal direction and/or distance may be selectively equalized to add emphasis to them. In particular, the DSP 256 can emphasize the end user's 50 focus on the desired "focused" sound by raising or lowering the volume of certain frequency components of that sound. The frequencies raised can be, but are not limited to, the frequency ranges to which human hearing is most commonly sensitive (e.g., 1 KHz to 5 KHz). Other DSP techniques can be used to add emphasis to the "focused" sound. Similarly, the sounds not originating from the focal direction and/or distance may be selectively equalized to remove emphasis from them in a complementary or opposite manner. In particular, the DSP 256 can deem phasize the end user's 50 focus on undesired sounds by raising or lowering the volume of certain frequency components of those sounds. In other words, if a "peak" equalization, such as +5 dB at 2 KHz is added to the target sound, a "notch" equalization of −5 dB at 2 KHz can be applied to all other sounds.

In another embodiment, the sound originating from the focal direction and/or distance may be profiled. In particular, the DSP 256 may analyze and compare the characteristics of the target sound to the characteristics of other sounds in order to determine a type of the target sound. The DSP 256 can then, if desired, emphasize all sounds of that type. For example, if the sound being focused on is a solo piano, and the sounds not being focused on originates from air conditioners and passing traffic, the DSP 256 can deemphasize sounds that are like the sounds originating from air-conditioners and passing traffic, and emphasize sounds that are like a solo piano, so that when other instruments play or more music is heard, those sounds, no matter their directions of origin, are emphasized over other sounds.

In an optional embodiment, the control subsystem is configured for instructing the display subsystem 104 to display to the end user 50 the direction and/or distance that the end user 50 is focused. For example, the display subsystem 104 may display a visual indicator, e.g., an "x" or cross hairs, in the augmented three-dimensional scene where the end user 50 is focused. Or, the display subsystem 104 may highlight the sound source (whether real or virtual) on which the end user 50 is focused. As an alternative, in the case where the sound source is real, the control subsystem may be configured for instructing the display subsystem 104 to display to the end user 50 the direction and/or distance of the greatest sensitivity of the microphone assembly 107, which may or may not exactly correlate to the focal direction or distance of the end user 50.

Figure 9A:
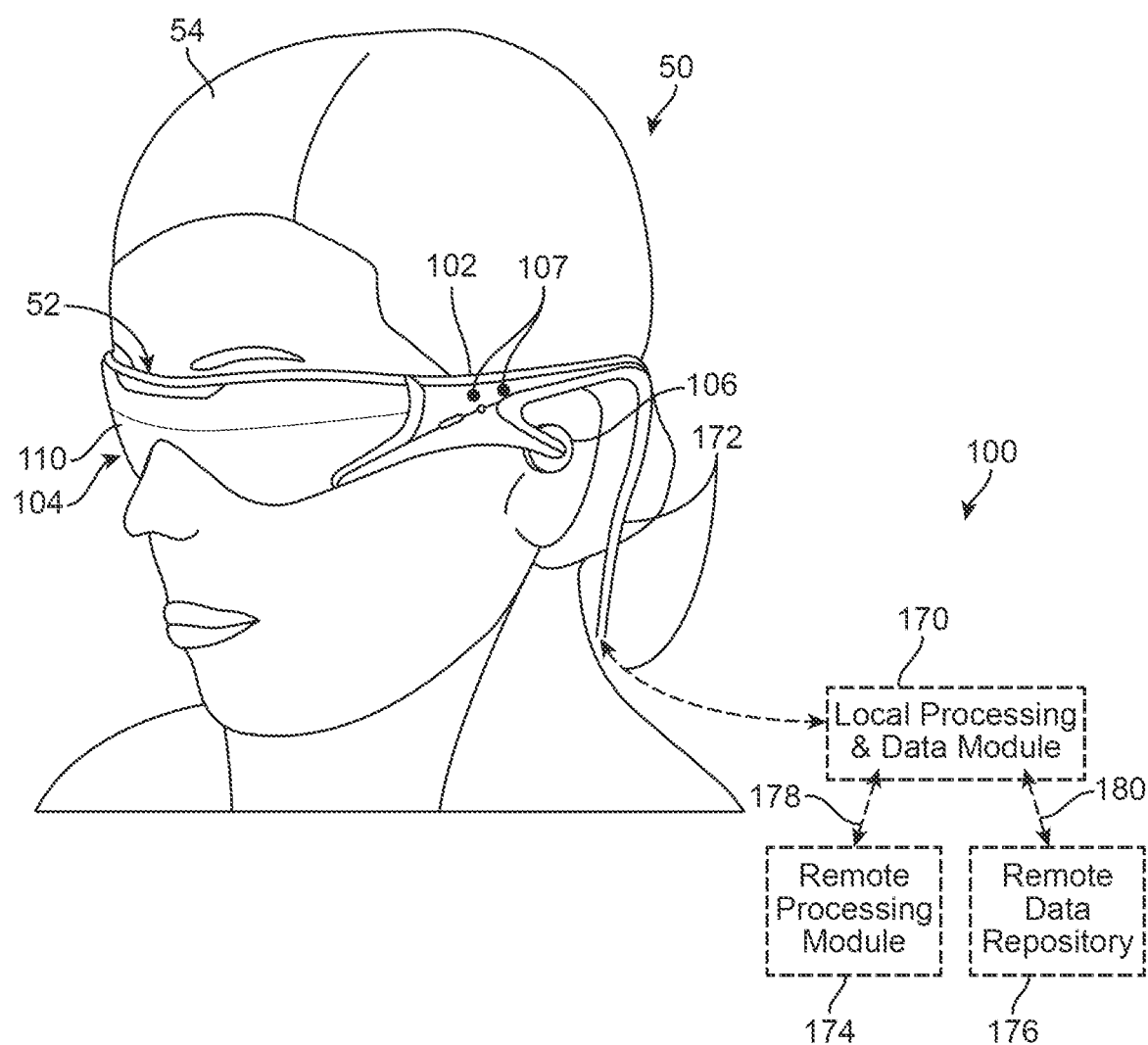
FIG. 9a is a plan view of one technique that can be used to wear the augmented reality system of FIG. 2.
Figure 9B:
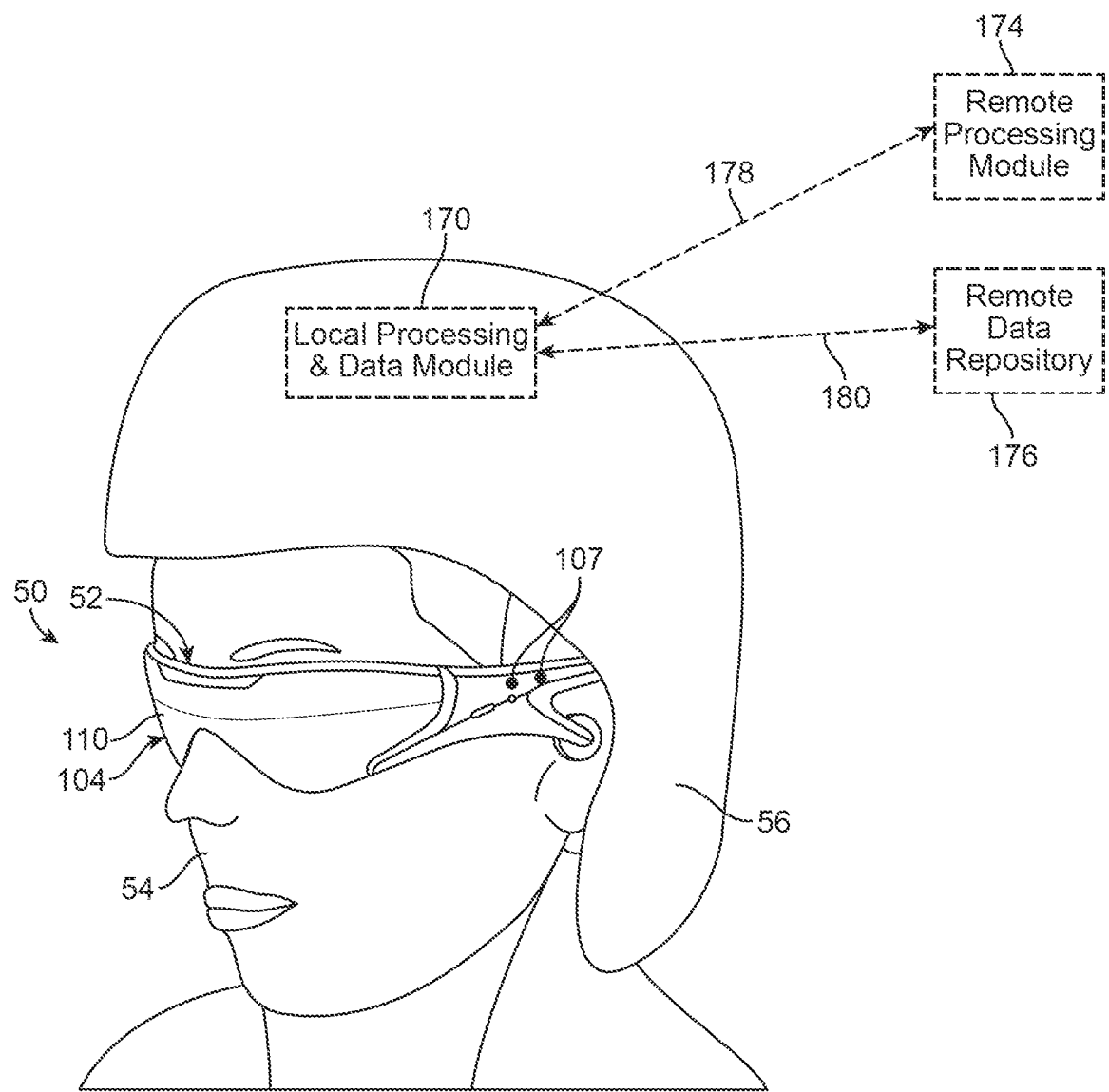
FIG. 9b is a plan view of another technique that can be used to wear the augmented reality system of FIG. 2.
Figure 9C:
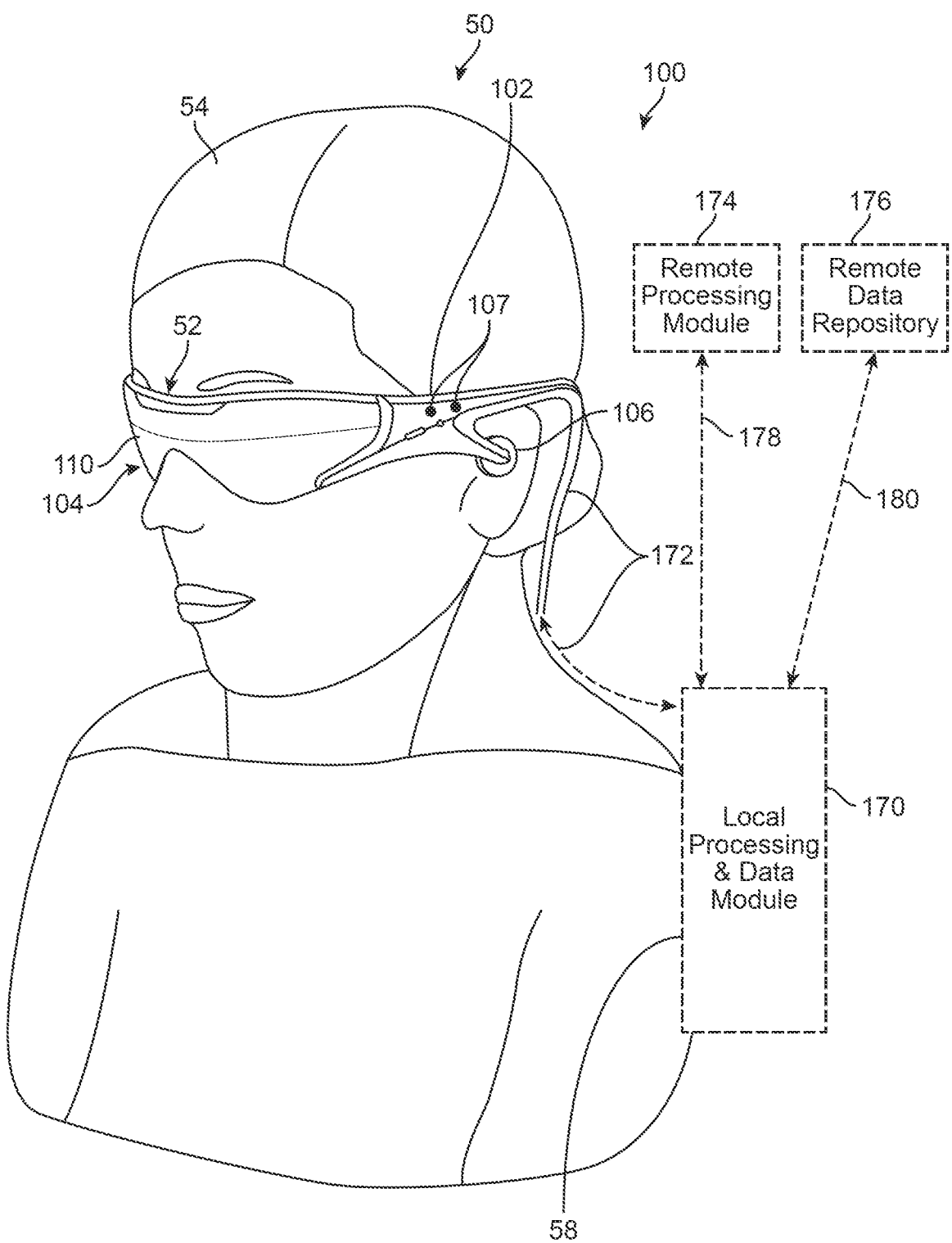
FIG. 9c is a plan view of still another technique that can be used to wear the augmented reality system of FIG. 2.
Figure 9D:
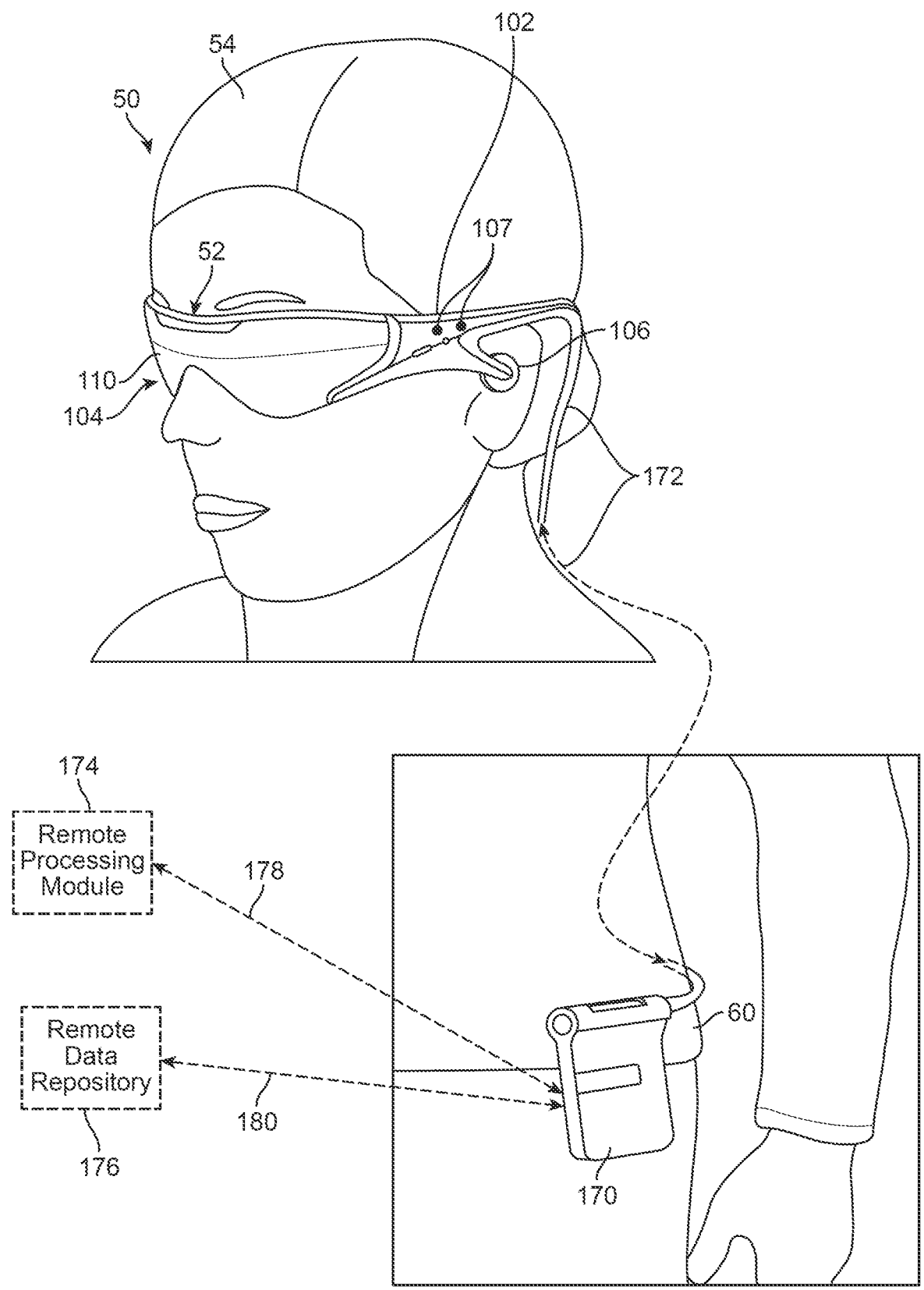
FIG. 9d is a plan view of yet another technique that can be used to wear the augmented reality system of FIG. 2.

The various processing components of the augmented reality system 100 may be physically contained in a distributed subsystem. For example, as illustrated in FIG. 9a-9d, the augmented reality system 100 comprises a local processing and data module 170 operatively coupled, such as by a wired lead or wireless connectivity 172, to a portion of the display subsystem 104. The local processing and data module 172 may be mounted in a variety of configurations, such as fixedly attached to the frame structure 102 (FIG. 9a), fixedly attached to a helmet or hat 56 (FIG. 9b), embedded in headphones, removably attached to the torso 58 of the end user 50 (FIG. 9c), or removably attached to the hip 60 of the end user 50 in a belt-coupling style configuration (FIG. 9d). The augmented reality system 100 further comprises a remote processing module 174 and remote data repository 176 operatively coupled, such as by a wired lead or wireless connectivity 178, 180, to the local processing and data module 170, such that these remote modules 174, 176 are operatively coupled to each other and available as resources to the local processing and data module 170.

The local processing and data module 170 may comprise a power-efficient processor or controller, as well as digital memory, such as flash memory, both of which may be utilized to assist in the processing, caching, and storage of data captured from the sensors and/or acquired and/or processed using the remote processing module 174 and/or remote data repository 176, possibly for passage to the display subsystem 104 after such processing or retrieval. The remote processing module 174 may comprise one or more relatively powerful processors or controllers configured to analyze and process data and/or image information. The remote data repository 176 may comprise a relatively large-scale digital data storage facility, which may be available through the internet or other networking configuration in a "cloud" resource configuration. In one embodiment, all data is stored and all computation is performed in the local processing and data module 170, allowing fully autonomous use from any remote modules.

The couplings 172, 178, 180 between the various components described above may include one or more wired interfaces or ports for providing wires or optical communications, or one or more wireless interfaces or ports, such as via RF, microwave, and IR for providing wireless communications. In some implementations, all communications may be wired, while in other implementations all communications may be wireless, with the exception of the optical fiber(s) 118. In still further implementations, the choice of wired and wireless communications may be different from that illustrated in FIGS. 9a-9d. Thus, the particular choice of wired or wireless communications should not be considered limiting.

In the illustrated embodiment, the display screen 110, optical coupling subsystem 116, and mechanical drive assembly 120 of the display subsystem 104, sensors, speaker(s) 106, and microphone elements 250 of the microphone assembly 107 are closely associated with the head 54 of the end user 50, while the light source(s) 116 and drive electronics 124 of the display subsystem 104, and the processing components of the microphone assembly 107 are contained in the local processing and data module 170. The user orientation module 148 and DSP 256 may be contained in the local processing and data module 170, while the CPU 150 and GPU 152 may be contained in the remote processing module 174, although in alternative embodiments, the CPU 150, GPU 152, or portions thereof may be contained in the local processing and data module 170. The three-dimensional database 160 can be associated with the remote data repository 176.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. An audio system, comprising:
at least one sensor configured for detecting a focus of a user on a first sound source;
a microphone assembly configured for converting sounds into electrical signals;
a control subsystem configured for determining at least one characteristic of a first sound originating from the first sound source by analyzing the electrical signals corresponding to the first sound, determining at least one characteristic of a second sound originating from a second source different from the first source by analyzing the electrical signals corresponding to the second sound, identifying that the second sound is the same type as the first sound by comparing the at least one characteristic of the second sound to the at least one characteristic of the first sound, and emphasizing the first sound and the second sound relative to a third sound originating from a third source different from the first source and the second source; modifying the electrical signals based on the emphasized first sound and second sound relative to the third sound; and
at least one speaker configured for converting the modified electrical signals to sounds for perception by the user.

2. The system of claim 1, wherein the first sound source is a real sound source.

3. The system of claim 1, wherein the control subsystem is further configured for selectively raising or lowering a volume of certain frequency components of the sounds, such that the first sound and the second sound are emphasized relative to the third sound.

4. The system of claim 1, wherein the type of the first sound is music.

5. The system of claim 1, wherein the second sound source is a real sound source.

6. The system of claim 1, wherein the control subsystem is further configured for processing the electrical signals corresponding to the first sound and the second sound, such that the first sound and the second sound are perceived by the user as respectively originating from the first sound source and the second sound source.

7. The system of claim 1, wherein the second sound source is outside the focus of the user.

8. The system of claim 1, wherein the control subsystem is configured for determining at least one characteristic of the third sound by analyzing the electrical signals corresponding to the third sound, and identifying that the third sound is a different type as the first sound by comparing the at least one characteristic of the third sound to the at least one characteristic of the first sound.

9. The system of claim 8, wherein the third sound source is a real sound source.

10. A method for processing audio, comprising:
detecting a focus of a user on a first sound source;
converting sounds into electrical signals;
determining at least one characteristic of a first sound originating from the first sound source by analyzing the electrical signals corresponding to the first sound, determining at least one characteristic of a second sound originating from a second source different from the first source by analyzing the electrical signals corresponding to the second sound, identifying that the second sound is the same type as the first sound by comparing the at least one characteristic of the second sound to the at least one characteristic of the first sound, and emphasizing the first sound and the second sound relative to a third sound originating from a third source different from the first source and the second source;
modifying the electrical signals based on the emphasized first sound and second sound relative to the third sound; and
converting the modified electrical signals to sounds for perception by the user.

11. The method of claim 10, wherein the first sound source is a real sound source.

12. The method of claim 10, further comprising selectively raising or lowering a volume of certain frequency components of the sounds, such that the first sound and the second sound are emphasized relative to the third sound.

13. The method of claim 10, wherein the type of the first sound is music.

14. The method of claim 10, wherein the second sound source is a real sound source.

15. The method of claim 10, further comprising processing the electrical signals corresponding to the first sound and the second sound, such that the first sound and the second sound are perceived by the user as respectively originating from the first sound source and the second sound source.

16. The method of claim 10, wherein the second sound source is outside the focus of the user.

17. The method of claim 10, further comprising:
    determining at least one characteristic of the third sound by analyzing the electrical signals corresponding to the third sound; and
    identifying that the third sound is a different type as the first sound by comparing the at least one characteristic of the third sound to the at least one characteristic of the first sound.

18. The method of claim 17, wherein the third sound source is a real sound source.

* * * * *